Aug. 19, 1952   J. W. CHAMBERLIN   2,607,208
LAUNDRY MACHINE
Filed Dec. 12, 1946   5 Sheets—Sheet 2

INVENTOR
JOHN W. CHAMBERLIN
BY M. W. Green
ATTORNEY

Aug. 19, 1952     J. W. CHAMBERLIN     2,607,208
LAUNDRY MACHINE Filed Dec. 12, 1946     5 Sheets-Sheet 3

Inventor.
John W. Chamberlin.
By M. W. Green
Attorney.

INVENTOR
JOHN W. CHAMBERLIN
BY M. W. Green
ATTORNEY

Aug. 19, 1952   J. W. CHAMBERLIN   2,607,208
LAUNDRY MACHINE

Filed Dec. 12, 1946                    5 Sheets-Sheet 5

INVENTOR
JOHN W. CHAMBERLIN
BY M. W. Green.
ATTORNEY

Patented Aug. 19, 1952

2,607,208

UNITED STATES PATENT OFFICE 2,607,208

LAUNDRY MACHINE

John W. Chamberlin, Mequon, Wis., assignor, by mesne assignments, to Avco Manufacturing Corporation, New York, N. Y., a corporation of Delaware Application December 12, 1946, Serial No. 715,758

26 Claims. (Cl. 68—12)

This invention relates to a laundry machine and more particularly to such machine which automatically accomplishes in predetermined cycles washing, rinsing, and extracting the cleansing liquid from the textiles or other materials being cleansed.

The present machine is a horizontal, rotating cylinder type automatic washer embodying an improved, effective, and conveniently arranged construction, and provides among other novel features the reduction of vibration caused by eccentric loading in the wash cylinder. I have overcome the heretofore undesirable vibration in horizontal rotating cylinder washers by providing novel construction in which the textiles or other materials being cleansed are held in a wash pattern providing reasonable uniform distribution, the effect of accelerating the speed of the cylinder for extracting purposes being to gradually force the textiles radially outwardly against the sides of the wash cylinder and at the same time extract the cleansing liquid from them.

Among the objects of the present invention are: to provide a laundry machine greatly reducing vibration in the rotating cylinder during high speed by holding the materials being cleansed in a pattern and position advantageous to reduction of vibration; to provide a rotating wash cylinder having flexible side walls; to provide a wash cylinder having side walls formed of a compressible accordion-fold-type sleeve with end panels, one of said end panels being movable toward and away from the other to compress the sleeve so as to hold the material being cleansed in such wash distribution pattern as to substantially eliminate vibration of the wash cylinder during rotation at high speeds; to provide a machine of the type referred to having a novel arrangement of automatic operating controls for the various operations occurring during one complete cycle of the machine; to provide a laundry machine substantially eliminating unequal distribution in the wash cylinder of the materials being cleansed; to provide means for effecting the shortening and lengthening of the wash cylinder; to provide novel means for introducing the wash and rinse water into the wash cylinder, and to provide automatically operating means for controlling the admission and draining of the cleansing liquid to and from the wash cylinder; to provide a novel arrangement of squeeze cylinders, diverting valve and other controls for automatic operation; and provide a novel arrangement of controls and operating parts in an automatic washer having a press squeeze method of textile distribution for water extraction.

Other objects and advantages will become readily apparent from the following detailed description taken in connection with the accompanying drawings, wherein.

While my invention further resides in the combination, construction and arrangement of parts illustrated in the accompanying drawings, I have shown therein, for illustrative purposes only, preferred embodiments and wish it understood that the same are susceptible of modification and change without departing from the spirit and scope of the appended claims.

The present invention solves the problem of vibration in the wash cylinder during high speed, by reducing the causes of vibration to an absolute minimum. Since eccentric loading, which causes vibration in the wash cylinder during high speed, is caused by the unequal distribution of the textiles or other materials being cleansed in the wash cylinder, I have provided means for substantially eliminating such vibration by holding the textiles or other materials being washed in an evenly distributed pattern during the wash cylinder high speed extraction period of the cycle of the machine operation. I have proven by exhaustive tests that a wash speed (in revolutions per minute) in the range between $$\sqrt{\frac{2500}{\text{Cylinder Radius in Feet}}}$$

and $$\sqrt{\frac{3000}{\text{Cylinder Radius in Feet}}}$$

provides a satisfactory distribution of textiles or other material being cleansed in the cylinder, prior to the extraction of liquid from the textiles and the like while operating the cylinder in a single direction. The present machine is so designed that the wash speed is held within this satisfactory distribution range. A compressing mechanism incorporated in the wash cylinder gradually compresses the textiles and the like between the front and rear panels of the wash cylinder while the tumbling clothes rearrange themselves to fit the gradually decreasing volume of the cylinder and finally holds them in the desired wash distribution pattern. Since the textiles are compressed between the panels and held in suspension therein, they do not move into large masses to cause eccentric loads. The only effect of accelerating and extracting speeds of the wash cylinder is that the centrifugal forces developed gradually force the textiles and the like radially outwardly against the sides of the wash cylinder and at the same time extract the cleansing liquid from them.

In the form shown in the drawings, my improved laundry machine comprises an outer casing consisting of an upper section 1, and a lower section 2, secured together by an exterior band 3, and a base 4 for supporting the outside stationary tube 5. At its forward end the outer casing is provided with the end panel 6 having a door 7 formed with a glass panel or window 8 to enable observation of the wash cylinder rotatably mounted upon the inside of the stationary tub 5, and openable to afford access to the door 82 in the wash cylinder through which the textiles or other material being cleansed may be inserted into the revolving tub. The upper section 1 of the outer casing has a covered control panel 9 providing for a table top and rendering the adjacent controls accessible. The lower section 4 includes an inlet door 10 for access to a button trap 11.

Figure 2:
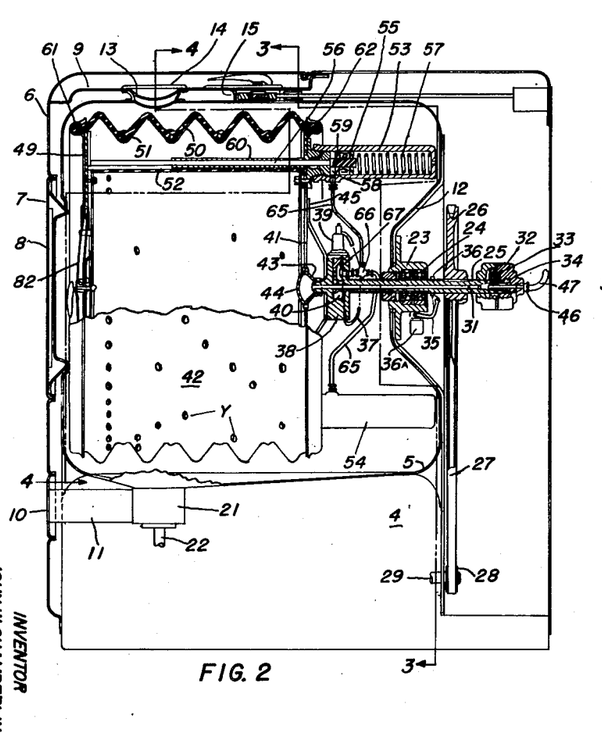
Fig. 2 is a vertical section of the machine taken on a median plane and showing the lower portion of the wash cylinder in elevation.
Figure 3:
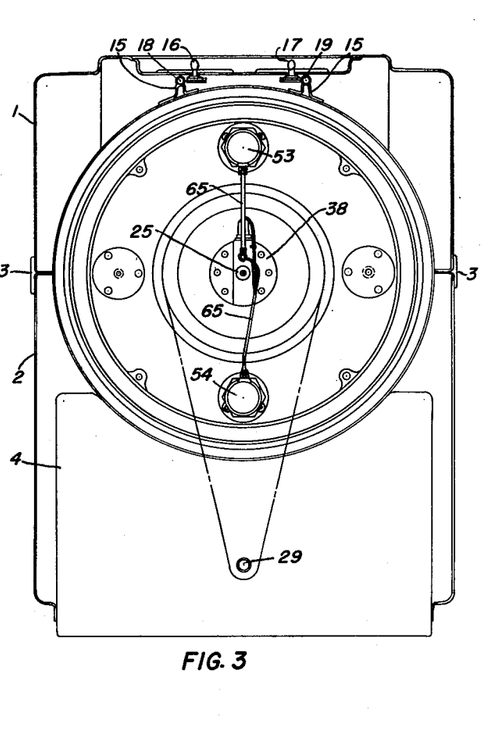
Fig. 3 is a section on the line 3—3 of Fig. 2.

Secured to the base 4 at the rear end of the machine is a drive shaft-support-bracket 12 which at its upper end is secured to the upper portion of the stationary tub, as seen in Fig. 2. This bracket is contoured to fit the rear face of the stationary tub and the base. A cut-out has been provided in the top of the stationary tub at 13 as a soap inlet, this being covered by removable door 14. Suitable bearing brackets 15 have been provided for the assembly of the controls 16 and 17, and control rods 18 and 19. Control rod 18 through action of the control 16 operates the water selector valve 20, while rotation of control rod 19 under action of the control 17 enables partial rotation of the control cams, later more fully described.

The stationary tub 5 is at its lowermost portion formed with a drain outlet 21 from which extends a drain pipe 22 to permit draining from the stationary tub of liquid contained therein, at the appropriate time of the washing cycle as later explained more in detail. Fixed in the drive shaft supporting bracket 12 is a drive shaft bearing housing 23 within which are positioned anti-friction bearing members 24 within which is rotated the drive shaft 25 upon which is fixed the pulley 26 driven by belt 27 from drive pulley 28 fixed upon the shaft 29 of the actuating motor 30.

It is to be noted that the drive shaft 25 is provided with a longitudinally extending opening 31 to permit wash and rinse water, and water for actuating the squeeze cylinder to be passed therethrough into the rotating tub and the squeezing cylinder, and to be drained therefrom as required in the various portions of the cycle of the machine. The right hand end of drive shaft 25 as viewed in Fig. 2 is rotatably mounted in a stationary bearing housing 32 provided with suitable bearing means 33 therewithin, and sealing means in the chamber 34 to prevent leakage of water between the end of the tubular drive shaft and the housing 32. The bearing housing 23 is provided with a commutator-energizing pivoted arm 35 operated by a solenoid 36A. Opposite the free end of arm 35 the drive shaft 25 is provided with a commutator-ring 36, which through a longitudinal opening in the drive shaft is connected with an electrical conducting wire 37 which extends outwardly through a lateral opening in the diverting valve housing 38 from whence this wire extends to the solenoid 39 for operating the diverting valve 40 as later more fully explained.

The drive shaft 25 has fixed to its inner end (the left hand end as viewed in Figs. 1 and 2) the rear panel 41 of the rotating wash cylinder indicated in general at 42 in Fig. 2. This juncture of drive shaft with said rear panel is effected by a perforated nozzle member 43, whose inner end is provided with a substantial number of apertures communicating with the interior of the wash cylinder for introducing wash and rinse water thereinto through the nozzle face 44. This connection of the drive shaft with the rear panel of the wash cylinder is strengthened by a supporting bracket 45 fixed at its outer portion to the rear panel and at its inner portion to the diverting channel housing.

Fixed to the driveshaft bearing housing 32 by a threaded inlet fitting 46 is a conduit member 47 which may be a pipe or other suitable hollow member (flexible or not as desired, including piping, hose, or the like). Conduit member 47 is extended to the driveshaft inlet and outlet valve 48, which when rotated into the position shown in Fig. 1 permits entry of liquid to the interior of the wash cylinder and to the squeeze cylinder, and when rotated into the position shown in Fig. 6 effects draining of said liquid from the squeeze cylinder, and from the washing cylinder should liquid be sufficiently high therein to reach the nozzle 44.

The wash cylinder comprises the rear panel 41 fixed to the rotating drive shaft 25, and a front panel 49, between which panels at its respective ends is fixed a flexible accordion-fold-type sleeve 50 formed with a large number of openings Y to permit access of cleansing liquid thereinto and escape of said liquid therefrom. Sleeve 50 is preferably formed of rubber or other suitable flexible material which, when the front panel 49 is moved toward the rear panel 41, will be flexed at the folds effecting squeezing of the textiles or other material being cleansed within the wash cylinder, and returned to its original shape when the front panel is again moved in a direction away from the rear panel.

The rubber sleeve 50 at each of the inner fold portions is provided with a supporting ring 51, which rings at all times maintain the sleeve in its folded contour and prevent it from bowing out during the extraction period. These rings are preferably of flexible cords, however, any suitable material may be used for such rings to accomplish the purpose stated.

The inner face of the rubber sleeve 50, at equally spaced distances around its circumference, is formed with four inwardly extending hollow rubber ribs 52, through two of which ribs extend the piston shafts, and through the other two of which extend the guide shafts and bearing housings between the front and rear panels, as later more fully explained. These ribs are integral with the rubber sleeve and are fixed in a water tight manner to the front and rear panels, so as to prevent entry of cleansing liquid from the interior of the wash cylinder to the said piston shafts and guide shafts and bearing housings.

Figure 1:
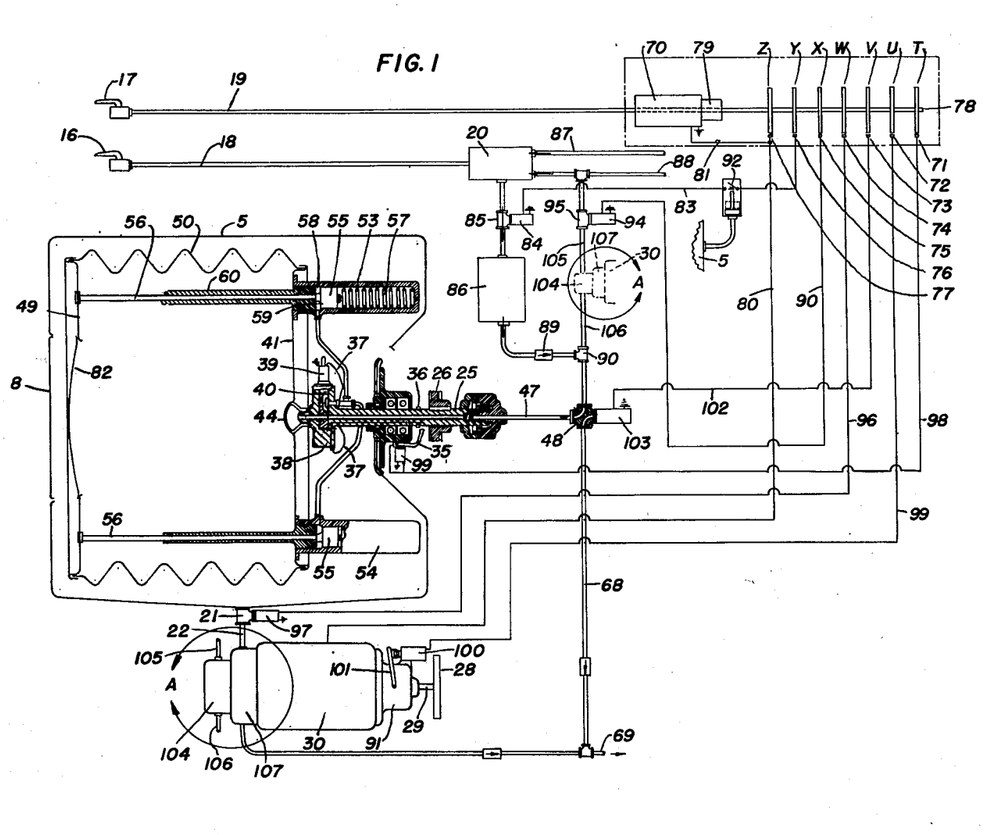
Fig. 1 is a schematic flow chart and wiring diagram of an automatic washer embodying my invention.

Fixed to the outer face of rear panel 41 at diametrically opposite points near the margin of said rear panel are a pair of squeeze cylinders 53 and 54, the upper one of which is shown in longitudinal section in Figs. 1 and 2. Each of these cylinders has longitudinally slidable therein a piston 55 having fixed thereto and extending to the front panel 49 a piston shaft 56, the outer end of which is fixed to front panel 49. Positioned between the piston 55 and the outer end of each of the cylinders 53 and 54 is a coiled compression spring 57. Piston shaft 56 adjacent piston 55 is formed with an enlarged shoulder 58 so that when coiled spring 57 forces the piston to the left as viewed in Figs. 1 and 2, the piston will be slightly spaced from the inner face of the piston head 59 to permit entry thereinto of liquid under high pressure for forcing the piston 55 to the right as viewed in Fig. 1, which action is accompanied by compression of coiled spring 57. Extending outwardly of the piston head 59 is a tubular member 60 which slidably receives the piston shaft 56.

As the structure of each of the squeeze cylinders 53 and 54 and their piston shafts 56 and connecting portions are identical, only one of them is being described in detail, it being understood that the same applies to both of these squeeze cylinders and associated parts. From the above description it is seen that when pistons 55 are forced outwardly against springs 57 the front panel 49 of the wash cylinder member is moved toward the rear panel, piston shafts 56 telescopically sliding within the tubular member 60 of the piston head 59. When the high pressure liquid holding these pistons in their outward position is released, coiled springs 57 will force the pistons 55 to the left as viewed in Figs. 1 and 2 and move the front panel 49 in a direction away from rear panel 41. A hole in the spring end of the squeeze cylinder will permit ingress and egress of air thereto and therefrom.

The rubber sleeve 50 is fixed to the front and rear panels by chime rings 61 and 62 respectively, to durably hold these parts together. As seen in Figs. 1 and 2, the piston shafts 56 are housed in two of the diametrically opposite ribs 52. Housed within the other two ribs are the guide shafts 63 (one in each of these ribs) which are fixed to the rear panel and slidably mounted in the front panel, to protrude therefrom and be moved inwardly therein, when the front panel moves toward and away from the rear panel, as will be understood in Fig. 9. Each of guide shafts 63 is slidably mounted in a tubular bearing housing 64 fixed to the front panel and stopping short of the rear panel a sufficient distance to allow for the squeezing movement of the front panel.

Connected to the space inside of each of the squeeze pistons 55 is a pipe 65 having connection at its inner end to a pipe fitting 66 from which extends a pipe into an opening leading into the chamber within the diverting valve housing, in which chamber the diverting valve 40 reciprocates at controlled intervals. The diverting valve 40 is formed with a U-shaped hole 67 so arranged that when the diverting valve is in the position shown in Fig. 6 this hole 67 will communicate at its inner end with the longitudinal opening in the drive shaft, and at its outer end with the opening leading to the inner end of the connection 66 to permit entry of high pressure liquid from the drive shaft through pipes 65 and into the space behind each of pistons 55 when the squeezing action is taking place in the wash cylinder. Also when the squeezing front panel 49 is being released to its normal position the high pressure liquid back of pistons 55 will be returned in the reverse direction back through the hollow drive shaft to the drive shaft the drive shaft inlet and outlet valve 48 through inlet and outlet valve 48 through the pipe 68 to the pipe 68 to the drain pipe 69. As hereinafter explained, the positioning of the parts to permit this entry and outlet of high pressure liquid to and from piston 55, will be automatically effected at the desired intervals by the automatic control arrangement. The control rod 19 (see Fig. 1) passes through the timer motor 70. This control rod 19 has suitable connection with a shaft 78 that extends beyond the reduction gearing 79, which latter shaft has fixed to its right hand end portion, as viewed in Fig. 1, at suitably spaced distances, the control cams T, U, V, W, X, Y, and Z. Opposite the edge of these control cams (one for each) are electrical switches 71, 72, 73, 74, 75, 76, and 77. Each of these cams is formed with the requisite number of high peripheral edges and interspaced low perpiheral edges so that when these cams are rotated in a complete revolution these high and low edges will act to close and open switches 71–77 the desired number of times to carry out the functions of the machine during one complete cycle. It will be understood that switches 71–77 are spring urged so that when a high edge on the cam presses thereagainst, the switch will be closed and when a low edge of the cam is opposite the switch, the switch will be opened. It will also be understood that a suitable wiring system will be connected with these switches, but for ease of understanding and brevity there have been shown in Fig. 1 only the wires from these respective switches to the electrical part operated thereby.

In the operation of this laundry machine, and assuming the electrical cord of the machine as being plugged into an electrical wall socket, and the switch closed to energize the various circuits upon the closing of switches 71–77 at their respective times as effected by the particular arrangement of high edges and low edges on the cams T—Z, the timer mechanism control 17 will be turned to turn the cam shaft 78 and advance the cams T—Z, which are fixed thereto, the desired amount. If a short soaking or washing period is desired, said cams will at that time be advanced a greater amount than if a longer soaking or washing period is desired. Timer motor 70 will have a suitable reduction gearing 79 to cause cam shaft 78 to rotate at a desired low speed determined by the length of the various operations to be performed throughout the cycle.

When the timer control mechanism, through operation of controller arm 17, is turned from "off" to "soak," the cam shaft 78 is turned and cam Z energizes the actuating circuit 80 through the actuating motor 30. Also connected to circuit 80 is a conductor 81 leading to the timer motor 70. Energization of circuit 80 and actuation of the actuating motor 30 causes rotation of the wash cylinder 42 through the medium of the drive shaft 25, pulley 26, belt 27 and drive pulley 28 fixed to the motor shaft. It will be understood that prior to starting the machine in operation the door 8 in the outer casing and the door 82 in the front panel of the wash cylinder will have first been opened and the textiles or other materials being cleansed inserted through said doors into the interior of the wash cylinder. These doors will then be closed and the operations last above mentioned started.

As stated above, the timer motor drives the reduction gear mechanism, which rotates the cam shaft 78 one revolution per cycle. When cam Z energizes the motor circuits 80 and 81, cam Y simultaneously energizes the circuit 83 to the solenoid 84, which when energized opens a valve in the housing 85 which permits water or other cleansing liquid to flow from the water selector valve 20 through this supply valve into the water mixing chamber 86. Leading into the water selector valve is a hot water pipe 87 and a cold water pipe 88. From mixing chamber 86 the water flows through the check valve 89 and T 90 into the drive shaft inlet and outlet valve 48. As this valve is normally open, the water flows through this valve into the longitudinal opening in the drive shaft and thence into the wash cylinder through the nozzle 44.

The actuating motor 30 drives the transmission gearing in housing 91 throughout the complete operating cycle, thus rotating the wash cylinder through the low speed washing period and the high speed extraction period as required. The water in the outer stationary tub is maintained at the proper level in a quiet zone from the stationary tub, but the float chamber cut-out switch 92, when the water reaches a certain level, breaks the circuit from cam Y to the wash and rinse water supply valve 85, and closes such circuit when the water level recedes. This maintains a substantially constant level of water in the wash cylinder during the soak, wash and rinse periods.

When the textiles are sufficiently soaked, cam Y deenergizes the circuit 83 to close the wash and rinse water supply valve 85, and cams X, W, and T simultaneously energize their circuits. The circuit from cam X is indicated at 93, and leads to the solenoid 94, which when energized opens the squeeze water supply valve 95 and cold water flows into the pressure pump 104. The circuit from cam W is indicated at 96 and leads to the solenoid 97, which when energized opens the drain valve 21 in the bottom of the stationary tub 5.

Figures 4, 5, 6, 7, 8, 9, 10:
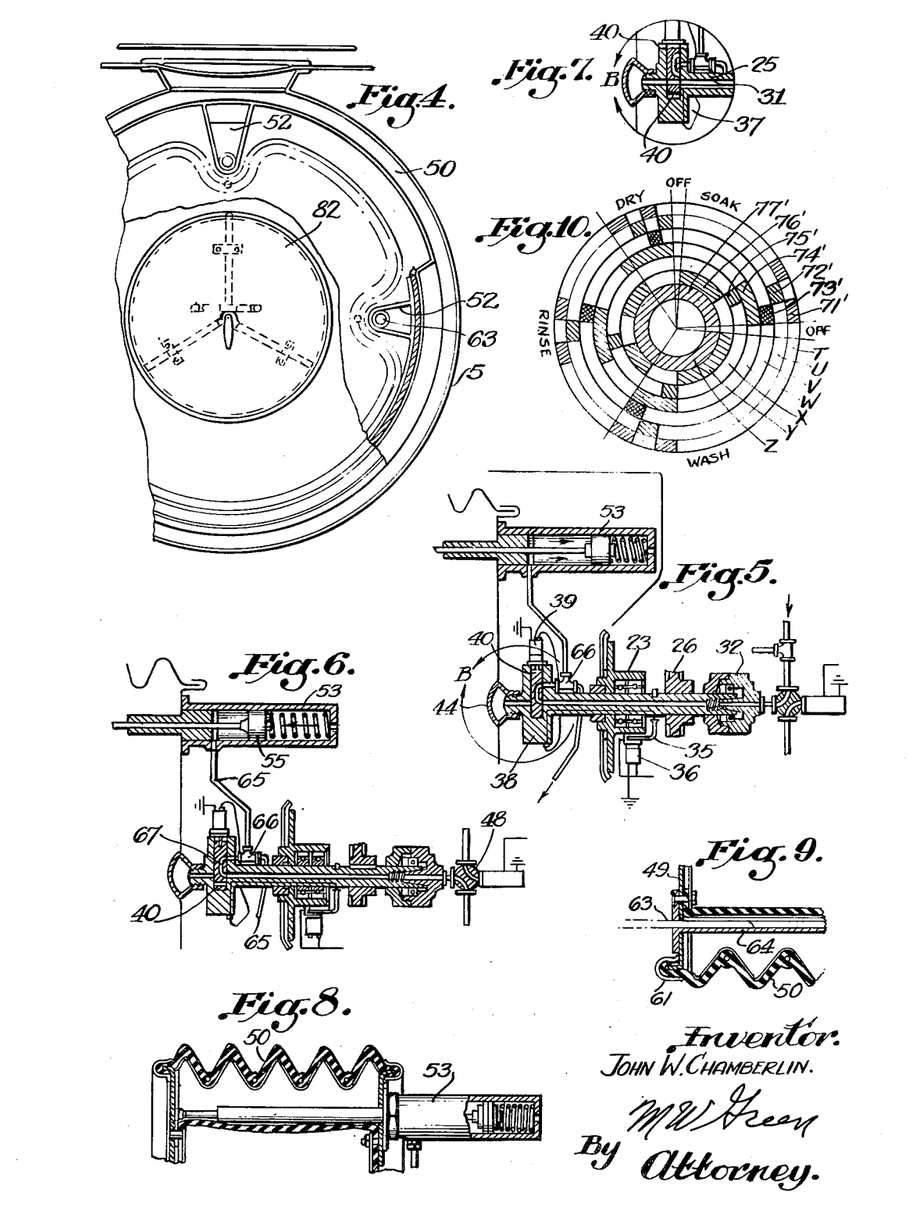
Fig. 4 is a fragmentary sectional view taken on the line 4—4 of Fig. 2.
Fig. 5 is a fragmentary vertical section of the drive shaft and one of the squeeze cylinders showing the diverting valve in position for admitting liquid into the squeeze cylinder, with the drive shaft inlet and outlet valve in position for admitting water to the longitudinal opening in the drive shaft.
Fig. 6 is a view similar to Fig. 5 but showing the drive shaft inlet and outlet valve in position to drain water from the squeeze cylinder to the drain pipe.
Fig. 7 is a fragmentary sectional view through the diverting valve and associated parts included in the portion B of Fig. 5 and showing this valve in position to admit wash and rinse water to the inside of the wash cylinder.
Fig. 8 is a fragmentary sectional view through the upper portions of the wash cylinder showing this cylinder in squeezing position.
Fig. 9 is a fragmentary sectional view of a portion of the rubber sleeve and rear panel and showing one of the guide shafts and its bearing housing.
Fig. 10 is a schematic view exemplifying the time chart and operation cycle for the various operations of the machine.
Figure 11:
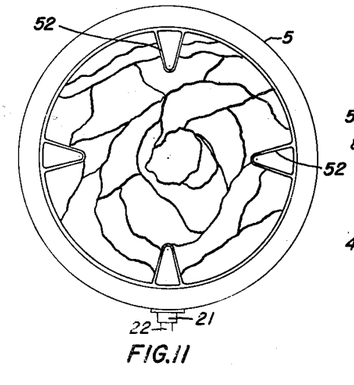
Fig. 11 is a vertical transverse section through the wash cylinder showing the more or less loose condition of the clothes therein while the washing cylinder is rotating at slow speed and before the squeezing action of the wash cylinder has occurred.
Figure 12:
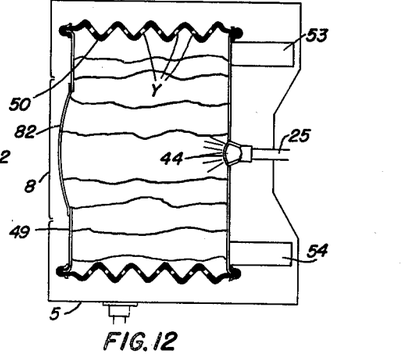
Fig. 12 is a vertical longitudinal section through the wash cylinder when in the position shown in Fig. 11.
Figure 13:
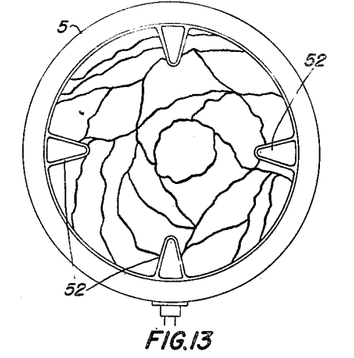
Fig. 13 is a vertical transverse section through the wash cylinder when in shortened squeeze position showing the even distribution of the textiles being washed when the textiles are being squeezed, just prior to increasing the speed of the cylinder to high speed.
Figure 14:
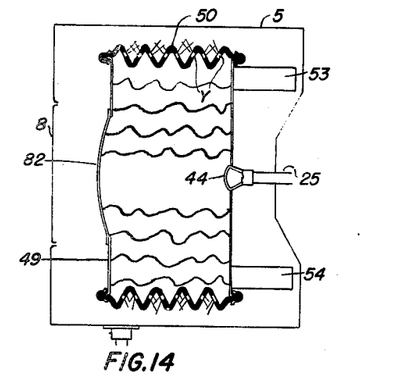
Fig. 14 is a vertical, longitudinal section of the wash cylinder of Fig. 13.
Figure 15:
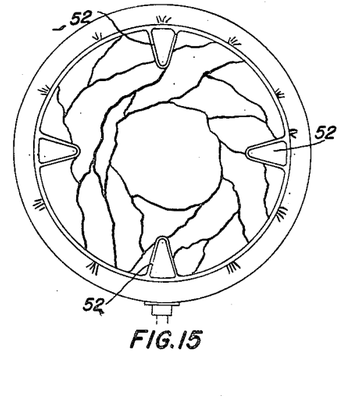
Fig. 15 is a view similar to Fig. 13 but showing the wash cylinder in high speed operation.
Figure 16:
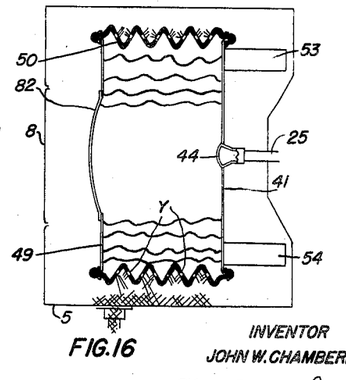
Fig. 16 is a vertical longitudinal section through Fig. 15.

The circuit from cam T is indicated at 98 and leads to the solenoid 99 which, when energized moves the commutator energizing arm 35 to contact commutator ring 36, and through conductor 37 energizes solenoid 39, which moves the diverting valve 40 inwardly into the position shown in Fig. 6 to permit flow of pressured water through pipes 65 into each of the squeeze cylinders 53 and 54. This forces the squeeze pistons against coiled springs 57, compressing them, and gradually moves the front panel of the wash cylinder 49 toward the front panel 41 to decrease the volume of the wash cylinder and maintain the clothes in an evenly distributed pattern in the wash cylinder, after the tumbling clothes have rearranged themselves to conform to the gradually decreasing volume of the clothes cylinder. Since the textiles are compressed between the panels and held in suspension therein, they do not cause eccentric loads by moving into large masses.

As soon as the squeeze cylinder pistons have fully compressed the coiled springs in the squeeze cylinders, the cams X and T are de-energized and cams W and U are simultaneously energized. De-energization of cam X de-energizes solenoid 94, thus stopping further flow of high pressure water into the squeeze cylinder, and de-energization of cam T de-energizes solenoid 39, and permits the diverting valve 40 under spring action to move from the position shown in Fig. 6 to the position shown in Fig. 1. This locks the high pressure water in the squeeze piston and holds it in that position until later released.

Energization of cam W, which as stated above, occurs simultaneously with de-energization of cams X and T, energizes circuit 96 and solenoid 97 to open the drain in the bottom of the stationary tub. Simultaneous energization of cam U through circuit 99 energizes solenoid 100, thus moving lever 101 of the gear change mechanism in housing 91, shifting these gears and causing rotation of the wash cylinder at high speed. The wash cylinder now rotates at the high extraction speed, and water is forced from the textiles through the perforations in the rubber sleeve of the wash cylinder into the outer stationary tub and thence to the drain through drain pipes 22 and 69.

At the conclusion of the extraction period, cam U de-energizes its circuit, thus de-energizing solenoid 100 and permitting the spring loaded clutch mechanism control to be returned to the wash (low speed) position. Cams V and T now energize their respective circuits, the circuit from cam V being designated at 102 and leads to the solenoid 103, which when energized rotates the drive shaft inlet and outlet valve 48 from the position shown in Fig. 1 to the position in Fig. 6. This connects the longitudinal opening in the drive shaft to the discharge pipe 68 which leads into the drain pipe 69, thus permitting release of high pressure liquid from behind each of pistons 55 and flow of this liquid through the diverting valve 40 when it is moved from the position shown in Fig. 1 to the position in Fig. 6, as is accomplished by energization of the circuit from cam T, which as stated above takes place simultaneously with the last-mentioned energization of the circuit from cam V.

This release of water from behind squeeze pistons 55 permits movement of the front panel 49 away from the rear panel 41 under action of the coil springs 57, the release of the water behind pistons 55 being caused by extension of these coiled springs. Next the slowly rotating cam shaft moves all of the cams to the off position indicated at the right hand side of Fig. 10. The cams have now all moved to de-energize all of their circuits during this off period. The machine is now ready to start the sequence of washing, rinsing, and drying by continued rotation of the cams.

The wash and rinse periods are identical in operation to the soak period, and as will be understood from the foregoing, these periods are caused by the predetermined arrangement of the high edges and low edges on the cams. It should be noted that at the beginning of the wash operation soap will be introduced through the soap door or opening 13 in the top of the stationary tub. It will be optional with the operator whether he wishes to introduce such soap at the beginning of the soak period or not. The water having been drained from the tub prior to and during the extraction occurring during the high speed of the wash cylinder during the wash period, it will be seen that when the rinse water is introduced into the wash cylinder, no soap will be needed.

The final dry period (see the chart in Fig. 10) has a slight variation just prior to the completion of the cycle. In this connection cam U is de-energized for a short period, returning the wash cylinder to the slow speed. During this final period the drain valve remains open. The return to slow or off speed of the wash cylinder permits re-distribution and fluffing of the textiles, which have been compressed against the outer extremities of the cylinder during the high extraction rotation.

As stated earlier herein, Fig. 1 is a schematic flow chart and wire diagram, and in this view for convenience the high pressure pump 104 (driven by the actuating motor) shown within the circle A at the bottom portion of Fig. 1, has been shown in dotted lines just above the drive shaft inlet and outlet valve 48. So as to better understand the connection of the piping leading to and from this high pressure pump which, as stated above, is axially incorporated in the housing 104 carried by the actuating motor housing and driven by said motor, it has for clearness been shown in the upper right hand circle A as incorporated in the piping of the system. This is for explanatory purposes only, and it will be understood that the identical structure in the two circles A constitute one and the same part and will be suitably located in the outer casing of the machine. Leading to one side of the high pressure pump is a pipe 105 as an inlet pipe to this pump, while outlet pipe 106 extends from the other side of the pump through the T 90 and into the valve 48.

Also mounted on the casing of the actuating motor 30 is a housing 107 containing the drain pump for withdrawing the drain water through pipe 22 and connection 21 from the bottom of the stationary tub.

The reduction gearing within casing 79 of the timer motor 70 is arranged to rotate the cam shaft 78 at a sufficiently slow speed to carry out at the proper intervals the various operations of the washing cycle described earlier herein. It is to be understood that while the controls are shown more or less spread out in Figs. 1 for illustrative purposes, they will be suitably grouped into a control space at any desired and suitable location within the outer casing of the machine.

Figures 17, 18, 19, 20, 21, 22:
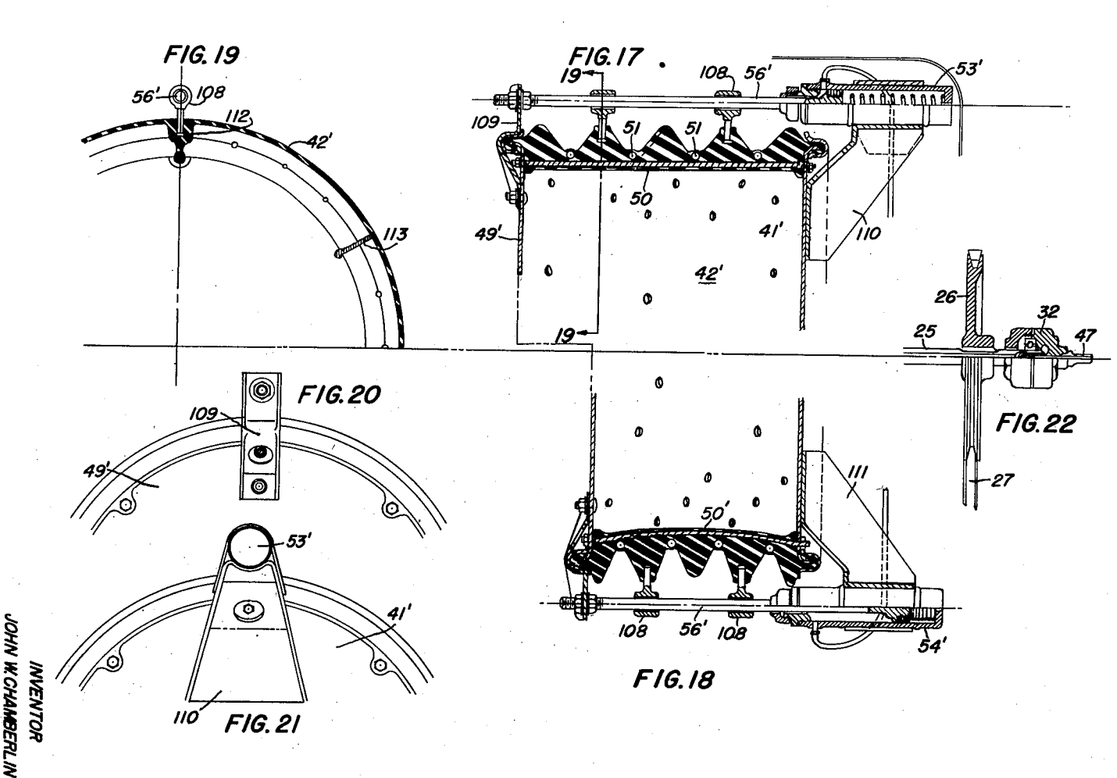
Fig. 17 is a vertical longitudinal section through the upper half of a modified form of wash cylinder before being moved to squeezing position.
Fig. 18 is a view similar to Fig. 17 but showing the cylinder in squeeze position.
Fig. 19 is a vertical transverse section on the line 19—19 of Fig. 17.
Fig. 20 is a partial end elevation looking toward the left hand side of the upper portion of Fig. 17.
Fig. 21 is a partial end elevation looking toward the right hand side of the upper portion of Fig. 17.
Fig. 22 is a schematic side view of the drive pulley, stationary end sealing member, a portion of the drive shaft and belt for rotating the same, the upper half of Fig. 22 being in vertical section and the lower half in elevation.

In Figs. 17–21 are shown a modified form of construction for the flexible sleeve forming the side walls of the wash cylinder. In this form the general operation is the same as that described above in the preferred form, but in this modification the mounting for the squeeze-piston shafts is somewhat different. As seen in Figs. 17 and 18 there are mounted upon opposite sides of the flexible cylinder 42' two or more support fittings 108 fixed in any suitable manner to extend outwardly from the exterior ribs of the flexible sleeve. These fittings 108 have alined openings therein to slidably receive the piston shaft 56', which shaft is fixed at its outer end by a pair of nuts, or other suitable fastening means, to the attaching bracket 109 fixed to the front panel 49'. The squeeze cylinders 53' and 54' are fixedly mounted to the rear panel 41' by brackets 110 and 111 so formed as to position the squeeze cylinders outside of the margin of the wash cylinder sleeve 42' to enable the piston shafts 56' to be positioned outside of the wash cylinder and away from contact with the cleansing liquid therein. As shown in Fig. 17, the sleeve 42' is formed of rubber, which because of the piston shafts being located outside of the wash cylinder, may omit the hollow ribs shown in the preferred form. If desired, any suitable form of rib may be formed on the inside of the wash cylinder.

As seen in Fig. 19, the rubber forming the side walls of the wash cylinder is provided with inwardly extending portions 112 within which the arms of the support fittings are secured, these portions 112 acting as ribs on the two diametrically opposite sides of the side walls of the wash cylinder. Other ribs 113 as shown in Fig. 19 may be added if desired.

For convenience I have in Fig. 10 diagrammatically shown a time chart of the various operations taking place during a complete cycle of operation of the machine. In other words, one complete revolution of the circles shown in this time chart will represent the various actions taking place during said complete cycle. For example, in this time chart are shown a plurality of circular paths, one for each of the operations of the various cams T—Z. As will be noted in this time chart, the operation of the machine will begin immediately following the "off" period indicated at the top of this time chart. As the cam shaft 78 slowly rotates, the "soak" action begins and extends to the next "off" portion, following around the time chart in a clockwise direction. After this short "off" period, occurs the "wash" period, then the "rinse" period, and finally the "dry" period. It is believed the various operations of this machine will be understood from this time chart, but for additional clarity it is pointed out that first considering the circular path T in Fig. 10, it will be seen that the cam T has operated twice in the "soak" period, the first operation being to permit entry of water behind the squeeze pistons for the squeezing operation, and the next time being for release of said water from the squeeze cylinders. These same two operations will be seen, by following the circular path T around further, to occur again in each of the "wash," "rinse," and "dry" sections of the time chart.

Also noting the circular path U it will be seen that in the "soak" section the rotation of the wash cylinder at high speed occurred once by operation of the cam U, once in the "wash" section, once in the "rinse" section, and once in the "dry" section. These occurrences of the various cams are indicated in the circular paths of the time chart by sectioned or darker small shaded areas. In Fig. 10 referring to the "soak" section the shaded area 71' represents the high edge portions on cam T which close switch 71 to first energize the solenoids 99 and 39 to admit liquid behind the squeeze pistons and at a slightly later interval to position the parts to permit escape of said liquid from the squeeze cylinder to the drain pipe 68. The shaded section 72' represents the high edge portion of the cam U which closes switch 72 to energize solenoid 100 for rotating the wash cylinder at high speed while extracting the soak water from the material being cleansed. Shaded section 73' represents the raised edge of cam V which at the appropriate interval closes switch 73, which energizes the solenoid 103 for rotating the valve 48 into position to permit drainage of the liquid from behind squeeze piston 55 to the drain pipe 68.

As will be noted in Fig. 10, raised portions 73' and the adjacent one of the raised portions 71' of the cam operates substantially simultaneously so that the liquid behind the squeeze piston may be conducted to the drain immediately upon positioning of the parts to permit such drainage. Shaded area 74' in the "soak" section of Fig. 10 represents the raised edge of the cam W which energizes the switch 74 to energize solenoid 97 to open drain 21 in the bottom of the stationary tub.

Shaded area 75' of Fig. 10 in the "soak" section represents the high edge portion of cam X to close switch 75 and energize solenoid 94, thus opening valve 95 to the high pressure pump 104 which forces liquid under high pressure back of squeeze piston 55. Shaded area 76' of Fig. 10 indicates the raised edge portion of cam Y which closes switch 76 and energizes solenoid 84 to open the wash inlet valve 85 to admit "soak" water through the mixing valve 86, valve 43 and through the longitudinal opening in the drive shaft to the interior of the wash cylinder. Shaded area 77' represents the raised edge portion of cam Z which closes switch 77 and energizes both the timer motor 70 and the actuating motor 30.

As will be noted in Fig. 10, these operations occur where indicated at the shaded areas in each of the "soak" section, "wash" section, "rinse" section and "dry" section of the complete cycle. Without duplicating the reference numerals of these shaded areas in said different sections of the wash cycle, the same can readily be located by allowing the eye to follow the same circular path from one of these shaded areas in one section to the similar shaded area in the next section, etc. It is thus seen that slow rotation of the cams T—Z will at the proper intervals of time effect the operations for each of the "wash," "rinse," and "dry" sections of the complete cycle in the same manner as that described above in connection with the "soak" section.

The sequence and sometimes simultaneous occurrence of these operations will be readily understood by inspecting the relationship between the shaded areas in Fig. 10.

I claim:

1. A laundry machine comprising, an outer stationary tub, an inner rotatable tub formed of an accordion-type flexible perforated sleeve having end panels, one of said panels having a door for providing access to the interior of said sleeve.

2. A laundry machine as claimed in claim 1, having means for rotating said inner tub, and means for automatically shortening the length of said sleeve in an axial direction at a predetermined point in the machine operating cycle.

3. A laundry machine as claimed in claim 1, having means for rotating said inner tub, and means for automatically shortening the length of said sleeve in an axial direction at a predetermined point in the machine operating cycle, and means for automatically increasing the speed of rotation of the inner tub when said sleeve length is shortened.

4. A laundry machine comprising, an outer stationary tub, an inner rotatable tub formed of flexible perforated side walls and having front and rear panels, and means for moving the front panel toward and away from the rear panel to flex the side walls for changing the length of the inner tub as it rotates.

5. A laundry machine as claimed in claim 4, said means including squeeze cylinders each having a piston shaft fixed to the movable front panel.

6. A laundry machine as claimed in claim 4, said means including squeeze cylinders each having a piston shaft fixed to the movable front panel, a piston in each of said squeeze cylinders fixed to its respective piston shaft, and means for automatically introducing pressure fluid into each of said cylinders back of its piston to shorten the length of the inner tub at predetermined points in the operating cycle of the machine.

7. A laundry machine as claimed in claim 4, said means including squeeze cylinders each having a piston shaft fixed to the movable front panel, a piston in each of said squeeze cylinders fixed to its respective piston shaft, and means for automatically introducing pressure fluid into each of said cylinders back of its piston to shorten the length of the inner tub at predetermined points in the operating cycle of the machine, and means for automatically releasing the fluid from back of said pistons to length the inner tub at other predetermined points in said cycle.

8. A laundry machine as claimed in claim 4, having supporting rings extending around the circumference of the flexible side walls of the inner tub.

9. A laundry machine as claimed in claim 4, having supporting rings extending around the circumference of the flexible side walls of the inner tub, said flexible side walls being in the form of an accordion-type sleeve, and said rings being embedded in the pleats of said sleeve.

10. A laundry machine as claimed in claim 4, said means including squeeze cylinders each having a piston shaft fixed to the movable front panel, said flexible side walls having a plurality of inwardly extending hollow, water-tight, rib-like members within which extends the major portions of said piston shafts to prevent access thereto of cleansing liquid within the inner tub.

11. A laundry machine as claimed in claim 4, said means including squeeze cylinders each having a piston shaft fixed to the movable front panel, and a plurality of guide shafts between the front and rear panels to further guide the lengthening and shortening movements of the inner tub.

12. A laundry machine as claimed in claim 4, said means including squeeze cylinders each having a piston shaft fixed to the movable front panel, and a plurality of guide shafts between the front and rear panels to further guide the lengthening and shortening movements of the inner tub, and means for preventing access to said guide shafts of cleansing liquid within the inner tub.

13. In a laundry machine, a rotatable compressible wash cylinder having a rear panel non-movable in an axial direction, a front panel movable in an axial direction, the side walls of said cylinder comprising an accordion-fold-type rubber sleeve forming the outer periphery of the cylinder, and means for axially moving the front panel.

14. A laundry machine as claimed in claim 13, in which said means includes a pair of squeeze cylinders located on opposite outer sides of the rear panel, each of said cylinders having a piston, and each of said pistons having a piston shaft connected to the front panel.

15. In a laundry machine, a rotatable wash cylinder having front and rear panels, and side walls comprising an accordion-fold-type rubber sleeve forming the outer periphery of the cylinder.

16. A laundry machine as claimed in claim 15, having supporting rings in the cross-section of the inner diameter of the folds to maintain the accordion-fold-contour of the sleeve under loaded conditions.

17. A laundry machine as claimed in claim 15, in which the front panel is axially movable, a pair of squeeze cylinders on the rear panel, each of said cylinders having a piston shaft connected to the front panel for moving the same axially, a pair of bearing supports between the front and rear panels, and four inwardly extending hollow rib-like members in said sleeve encompassing said piston shafts and said bearing supports to prevent access thereto of cleansing liquid within the cylinder and material in the cylinder being cleansed.

18. A laundry machine, comprising, a rotatable wash cylinder, a drive shaft for rotating said cylinder, said drive shaft having a longitudinally extending opening therethrough, a valve laterally slidable in said shaft and having an opening that may be selectively in and out of registry with the opening in the shaft, and means for automatically moving said valve at predetermined periods during rotation of the wash cylinder for introducing wash and rinse liquid into the cylinder and at other periods for preventing such introduction.

19. A laundry machine as claimed in claim 18, having a squeeze cylinder adapted to receive liquid under pressure from the drive shaft longitudinal opening when said valve is moved to position to prevent introduction of liquid into the wash cylinder.

20. A laundry machine as claimed in claim 18, having a squeeze cylinder adapted to receive liquid under pressure from the drive shaft longitudinal opening when said valve is moved to position to prevent introduction of liquid into the wash cylinder, said squeeze cylinder having a piston and piston shaft, said wash cylinder having a movable end panel connected to the piston shaft for shortening and lengthening the wash cylinder upon operation of the squeeze piston.

21. A laundry machine as claimed in claim 18, having a squeeze cylinder adapted to receive liquid under pressure from the drive shaft longitudinal opening when said valve is moved to position to prevent introduction of liquid into the wash cylinder, said squeeze cylinder having a piston and piston shaft, said wash cylinder having a movable end panel connected to the piston shaft for shortening and lengthening the wash cylinder upon operation of the squeeze piston, said wash cylinder having a flexible sleeve constituting the side walls of the wash cylinder.

22. A laundry machine as claimed in claim 18, having a squeeze cylinder adapted to receive liquid under pressure from the drive shaft longitudinal opening when said valve is moved to position to prevent introduction of liquid into the wash cylinder, and a movable drive-shaft-inlet-and-outlet valve which when in one position will selectively enable flow of liquid into the wash cylinder and squeeze cylinder depending upon the position of said first mentioned valve, and when in another position will enable drain of liquid from the squeeze cylinder and drive shaft.

23. In a laundry machine, a rotatable wash cylinder having flexible side walls, means for changing the length of the wash cylinder, means for selectively rotating the wash cylinder at low and high speeds, and means for so controlling the operation of the wash cylinder that it will be rotated at low speed when it is at its greatest length, and will be rotated at high speed when it is at its shortest length.

24. A laundry machine comprising a rotatable cylinder having a rear panel and a front panel, a squeeze cylinder on one of said panels, a piston connection from one of said panels to the other of said panels, said piston connection adapted to axially move one of said panels to shorten or lengthen said cylinder, a main conduit adapted to carry fluid into said machine, and an automatically operable diverting valve operable to divert fluid from said conduit into said squeeze cylinder thereby to control the ingress and egress of pressure fluid with respect to said piston connection.

25. A laundry machine, comprising a rotatable tub having end panels and side walls, one of said panels having a tubular drive shaft fixed thereto for rotating the tub, the longitudinal opening in the drive shaft being connected with the interior of the tub for introducing wash and rinse water thereinto, said shaft having a rotatable housing, a main conduit for conveying water to said machine, a diverting valve slidable in said housing and rotatable therewith, said valve having an opening that may be registered with the longitudinal opening in said drive shaft to divert water from said main conduit and admit said water to the tub through said longitudinal opening, and means for moving said valve to admit or cut off said water to and from said tub.

26. A laundry machine as claimed in claim 25, in which said means for moving said valve is electrically operated for automatically controlling the opening and closing of said valve at predetermined points in one complete cycle of the machine's operation.

JOHN W. CHAMBERLIN.

REFERENCES CITED

The following references are of record in the file of this patent:

UNITED STATES PATENTS

| Number | Name | Date |
| --- | --- | --- |
| 2,165,884 | Chamberlin | July 11, 1939 |
| 2,187,770 | Chamberlin | Jan. 23, 1940 |
| 2,230,533 | Eckler | Feb. 4, 1941 |
| 2,335,560 | Crane | Nov. 30, 1943 |